United States Patent [19]

Hughes et al.

[11] Patent Number: 5,420,211
[45] Date of Patent: May 30, 1995

[54] GRAFT POLYMERS AS BIODEGRADABLE DETERGENT ADDITIVES

[75] Inventors: Kathleen A. Hughes; Graham Swift, both of Blue Bell, Pa.

[73] Assignee: Rohm and Haas Company, Philadelphia, Pa.

[21] Appl. No.: 210,524

[22] Filed: Mar. 18, 1994

Related U.S. Application Data

[60] Division of Ser. No. 790,945, Nov. 12, 1991, Pat. No. 5,318,719, which is a continuation-in-part of Ser. No. 441,122, Nov. 22, 1989, abandoned.

[51] Int. Cl.⁶ .................... C11D 3/37; C23F 11/173
[52] U.S. Cl. .................... 525/404; 525/50; 422/17; 422/19; 528/271; 528/365; 528/366; 252/180; 252/181; 252/174.24; 252/174.23
[58] Field of Search .............. 422/17, 19; 525/50, 525/404; 528/271, 365, 366; 252/180, 181, 174.24

[56] References Cited

U.S. PATENT DOCUMENTS

| | | |
|---|---|---|
| 3,546,321 | 12/1970 | Jabloner et al. . |
| 4,314,044 | 2/1982 | Hughes et al. . |
| 4,404,114 | 9/1983 | Mohr et al. ........................ 252/75 |
| 4,612,352 | 9/1986 | Schäfer et al. . |
| 4,970,005 | 11/1990 | Schuchardt ........................ 210/759 |

FOREIGN PATENT DOCUMENTS

| | | |
|---|---|---|
| 11833 | 6/1980 | European Pat. Off. . |
| 98803 | 1/1984 | European Pat. Off. . |
| 299691 | 1/1989 | European Pat. Off. . |
| 1562105 | 2/1969 | France . |

*Primary Examiner*—Vasu S. Jagannathan
*Attorney, Agent, or Firm*—James G. Vouros

[57] ABSTRACT

This invention relates to a novel class of biodegradable water-soluble graff copolymers having building, antifilming, dispersing and threshold crystal inhibiting properties comprising (a) an acid functional monomer and optionally (b) other water-soluble, monoethylenically unsaturated monomers copolymerizable with (a) grafted to a biodegradable substrate comprising polyalkylene oxides and/or polyalkoxylated materials.

4 Claims, No Drawings

GRAFT POLYMERS AS BIODEGRADABLE DETERGENT ADDITIVES

This is a divisional of application Ser. No. 790,945, filed Nov. 12, 1991, now U.S. Pat. No. 5,318,719 which is a CIP of Ser. No. 07/441,122 filed Nov. 22, 1989 now abandoned.

FIELD OF THE INVENTION

This invention relates to novel graft copolymers and, more particularly, to graft copolymers prepared by grafting acid functional monomers onto biodegradable polyalkylene oxides and polyalkoxylated substrates. These graft copolymers are biodegradable and are useful preferably as detergent additive polymers acting as builders, anti-filming agents, dispersants, sequestering agents and encrustation inhibitors. The term detergent, as used herein, relates to textile laundering detergents, hard surface cleaners, such as formulations used in automatic dishwashers, and other compositions useful as cleaners.

BACKGROUND OF THE INVENTION

In detergent applications, large volumes of chemicals are used. Because these chemicals may eventually enter the environment and reside in subsurface waters or open bodies of surface waters, it is highly desirable for such chemicals to be degradable in order to eliminate any environmental problems. Traditionally, detergents and cleaning agents have contained phosphates. These phosphates are added as detergent builders, acting to sequester alkaline earth metal hardness ions as encrustation inhibitors and as antiredeposition agents. Despite the fact that the well known inorganic phosphorus compounds are highly effective and relatively non-toxic, they lead to environmental problems such as causing excess plant growth, resulting in eutrophication of lakes.

During the past three decades efforts have been made in the detergent industry to convert from the eutrophying polyphosphates to more environmentally acceptable materials such as polycarboxylic acid polymers (e.g., polyacrylic acids). In a similar situation, the ubiquitous branched alkyl benzene sulfonates (ABS), probably the most popular surfactants, were replaced by their biodegradable linear counterparts (LAS) to eliminate build-up in surface and subsurface waters.

While the polycarboxylic acid polymers and copolymers currently used in detergents and water treatment applications do not suffer from the same drawbacks as the phosphorus-containing inorganic builders or the foam producing ABS surfactants, the past has taught it is most desirable that chemicals used in large volume applications which enter the environment be biodegradable. Unfortunately, most polycarboxylic acid polymers and copolymers useful in detergent applications or as dispersants or as water treatment chemicals are not highly biodegradable.

Some effort has been made to provide biodegradable water-soluble polymers through the use of comonomers containing two ethylenically unsaturated double bonds. Notable in this regard is European Patent Application No. 291.808, filed May 7, 1988 (assigned to BASF Aktiengeseilschaft). Disclosed in the '808 application are water-soluble copolymers prepared by the copolymerization of monomer mixtures of at least one monoethytenically unsaturated monocarboxylic acid, at least one comonomer containing at least two ethylenically unsaturated non-conjugate double bonds and at least one COO—X group, at least one monoethylenically unsaturated dicarboxylic acid, hydroxyl esters of monoethylenically unsaturated carboxylic acids and other water-soluble monoethylenically unsaturated monomers. However, studies of these polymers have revealed they are difficult to make and do not combine the balance of good performance properties and biodegradability.

U.S. Pat. No. 4,746,456 ('456) discloses a detergent composition containing a graft copolymer of polyalkylene oxides and vinyl acetate which purportedly act as a soil redeposition inhibitor. The detergent composition disclosed in the '456 patent contains from 0.1 to 3% of the graft copolymer obtained from grafting onto a polyalkylene oxide polymer of ethylene oxide, propylene oxide or butylene oxide, vinyl acetate in a weight ratio of from 1:0.2 to 1:10. However, the detergent compositions of the '456 patent still contain phosphate along with this soil redeposition inhibitor and these graft copolymers are not readily biodegradable.

We have now discovered that graft copolymers prepared by grafting acid functional monomers onto biodegradable polyalkylene oxide and polyalkoxylated substrates form graft copolymers which are biodegradable and are useful as detergent additives. These graft copolymers are particularly biodegradable when they are prepared by a process which yields short chain graft units which is obtained by utilizing a metal salt, preferably a salt generating copper ions.

SUMMARY OF THE INVENTION

It is an object of the present invention to provide novel water-soluble polymers of acid functional monomers grafted onto polyalkylene oxides. It is a further object of this invention to provide novel biodegradable graft copolymers. It is a still further object of this invention to provide a detergent formulation and a method of inhibiting scale formation utilizing said novel biodegradable graft copolymers.

DETAILED DESCRIPTION OF THE INVENTION

The copolymers of this invention are prepared by grafting acid functional monomers onto polyalkylene oxide substrates by way of an aqueous polymerization processes utilizing water-soluble, free-radical forming initiators and a metal salt. These graft copolymers are biodegradable and are useful as detergent additives and builders, dispersants, sequestering agents and encrustation inhibitors.

Although the mechanism of the process set forth herein is not fully understood, it is believed that the metal salts used in the grafting reaction of this invention act as polymerization moderators, that is they control the molecular weight, the chain length and the degree of branching of the grafted side chain. It is further believed the polymerization moderators lead to the formation of short, unbranched graft chains and therefore to a more biodegradable chain. This is analogous to the abovementioned branched alkyl benzene sulfonates (ABS) that were replaced by their linear counterparts (LAS) to improve biodegradability. Even though a linear side chain is preferred for the copolymers of this invention, chains with a greater amount of branching which may not be as biodegradable, may be adequate for the uses described herein. The theory of this invention is presented here as a possible explanation to the surprising results obtained and in no way is intended to limit the scope of this invention.

The starting substrates onto which the acid functional monomers can be grafted are biodegradable and include polyalkylene oxides and polyalkoxylated materials having a number average molecular weight (Mn) of from about 100 to 100,000 and more preferably from about 200 to 10,000 and are based on ethylene oxide, propylene oxide, butylene oxide or combinations thereof. Examples of biodegradable grafting substrates include polyethylene oxides, polypropylene oxides, polybutylene oxides, polystyrene oxides, copolymers of alkylene oxides, ethers and esters of polyalkylene oxides, and polyethoxylated castor oils. The more preferable substrates are polyethylene oxides, alkyl and aryl polyethoxylates, polyethoxylated castor oils and copolymers of ethylene oxide and propylene oxide. The weight ratio of substrate polymer to acid functional monomer is preferably about 1:20 to 5:1, more preferably about 1:20 to 4:1, even more preferably about 1:20 to 3:1 and even more preferably about 1:10 to 1:1.

Monomers useful in forming the graft side chains can contain as polymerized units;

(a) acid functional ethylenically unsaturated monomers such as acrylic acid, methacrylic acid, maleic acid, itaconic acid, crotonic acid, vinyl acetic acid, acryloxypropionic acid, related monomers or combinations thereof and 0 to 35% based on the total weight of the substrate and depending on the limit of their solubility, (b) other water-soluble or water insoluble ethylenically unsaturated monomers copolymerizalale with (a) such as alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butyl acrylamide, N-methyl acrylamide, N,N-dimethyl acrylamide; acrylonitrile, methacryionitrile, allyl alcohol, allyl sulfonic acid, allyl phosphonic acid, vinylphosphonic acid, dimethylaminoethyl acrylate, dimethylaminoethyl methacrylate, phosphoethyl methacrylate, N-vinyl pyrollidone, N-vinylformamide, N-vinylimidazole, ethylene glycol diacrylate, trimethylotpropane triacrylate, diailyl phthalate, vinyl acetate, styrene, vinyl sulfonic acid and its salts, 2-acrylamido-2-methyl propane sulfonic acid (AMPS) and its salts or combinations thereof.

Initiators useful in this process are the well know water-soluble, free-radical forming compounds. The preferred water-soluble initiators which may be used are peroxy, persulfate, perphosphate and azo initiators including hydrogen peroxide, t-butyl hydroperoxide, sodium persulfate, potassium persulfate, ammonium persulfate, sodium perphosphate, ammonium perphosphate, potassium perphosphate, 2,2-azobis (cyanovaleric acid) or combinations thereof. The more preferred initiators are hydrogen peroxide and tertiary butyl hydroperoxide. The initiator concentration is normally between 0.5% and 25% by weight based on the total weight of the monomers and more preferably from 1 to 10%.

The present invention employs water-soluble metal salts, such as the salts of copper, iron, cobalt and manganese, at very low levels of from about 1 to 200 parts per million (ppm) of the metal ion, based on the weight of the acid functional polymerizing monomers and more preferably from about 5 to 100 ppm. The more preferred metal salts are the copper salts, which include all inorganic and organic compounds that will generate copper ions in aqueous solution. Among suitable copper salts are: copper sulfate, copper nitrate and copper chloride. Suitable organic copper compounds include: copper acetate and inert, water-soluble copper complexes. The copper salts might be used as a sole source of metal or in combination with other transition metal salts. The amount of metal ion present during the reaction is critical to the graft polymerization of this invention. If the level of metal ion is too high, the percent monomer conversion decreases to an unacceptably low level, and if the level of metal ion is too low, the effect of molecular weight control as described above is diminished.

Polymerizations are preferably run with partial in-process neutralization. Typical levels of neutralizers are from 20 to 95 equivalent % of base, more preferably from 20 to 80 equivalent % of base, based on the acid functionality of the monomer. Examples of in-process neutralizers include sodium, potassium or ammonium hydroxide or amines, such as, triethanolamine. These neutralizers are added to the polymerization reaction as an aqueous solution.

The graft polymerization can be run using a batch process or a continuous process and is run preferably at a solids level of from 10 to 90%, more preferably from 35 to 65%. The polymerization reaction is preferably run at a temperature of from about 60° to 150° C. and more preferably from about 80° to 130° C. In the batch process an aqueous solution of the graft substrate is placed in a reaction vessel and the metal salt is added thereto. The solution is heated and then an aqueous solution of one or more monomers, a solution of initiator and a neutralizing solution are added to the reaction vessel over a period of several hours. An alternate variation involves combining two or more of the solutions prior to addition to the reactor, and a further alternative involves the addition of any comonomers as separate solutions. The addition rates are from 1 to 10 hours and more preferably from 1 to 5 hours.

In the continuous process the reactor is normally initially charged only with water or an aqueous solution of the metal salt and is heated to an increased temperature. The metal salt may optimally be simultaneously cofed into the reaction vessel or contained in the initial charge, or both. Grafting substrates, monomers, initiator and neutralizer may then be added at a substantially uniform rate, whereby a substantially uniform rate may include the simultaneous, linear addition of the cofeed solutions or the addition of the cofeed solutions at slightly different rates and times. Preferably, four solutions are cofed into the reaction vessel: (1) the monomer solution; (2) the graft substrate solution; (3) the initiator solution; and (4) the neutralizer solution. A satisfactory alternative variation involves combining two or more of the four solutions prior to addition to the reactor, and a further alternative involves the addition of any comonomers as separate solutions. The rate and time of addition of the monomers and initiator can be varied to account for the difference in reactivity of the monomers and thereby maximize the conversion of the monomers. For this continuous process, the residence time is from 0.25 to 5 hours, more preferably from 0.5 to 2 hours.

The above copolymers are useful as detergent and cleaning agent additives and as dispersants or water-treatment chemicals. The graft copolymers can be used as described above or, optionally, the end groups of polyalkylene oxides can be blocked, whereby the free OH groups of the polyalkylene oxides can be etherified, esterified, acetalized and/or aminated. Detergent compositions of the present invention may be in any of the usual physical forms, such as powders, beads, flakes, bars, tablets, noodles, liquids, pastes, and the like. The detergent compositions are prepared and utilized in the conventional manner and are usually based on surfactants and, optionally, on either precipitant or sequestrant builders.

Suitable surfactant are, for example, anionic surfactants, such as from $C_8$ to $C_{12}$ alkylbenzenesulfonates, from $C_{12}$ to $C_{16}$ alkane sulfonates, from $C_{12}$ to $C_{16}$ alkylsulfonate, from $C_{12}$ to $C_{16}$ alkylsulfosuccinates and from $C_{12}$ to $C_{16}$ sulfated ethoxylated alkanols and nonionic surfactants such as from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide. The surfactants usable in detergents can also have an amphoteric character and they can be soaps.

In general, the surfactants constitute from 2 to 50, preferably 5 to 45 wt % by weight of the detergent or cleaning formulation. Liquid detergents usually contain as components liquid or even solid surfactants which are soluble or at least dispersible in the detergent formulation. Surfactants suitable for this purpose are liquid polyalkylene oxides or polyalkoxylated compounds, products that can also be used in powdered detergents.

Examples of sequestrant builders contained in the detergent and cleaning agents of the present invention can include phosphates, specifically, orthophosphates, pyrophosphates and especially sodium tripolyphosphate. Further examples are the zoolites, sodium carbonate, polycarboxylic acids, nitrilotriacetic acid, citric acid, tartaric acid, the salts of the aforesaid acids and the monomeric, oligomeric or polymeric phosphonates.

The amounts of the individual substances used in the preparation of detergent formulations by weight based on the total weight of the detergent formulation are, for example, up to 85% sodium carbonate, up to 45% phosphates, up to 40% zeolites, up to 30% nitrilotriacetic acid and phosphonates and up to 30% polycarboxylic acids. Because of the severe environmental pollution caused by the use of phosphates, the phosphate content of detergent and cleaning agent formulations is being reduced so that detergents currently contain less than about 30% of phosphates or preferably are phosphate-free. In certain liquid detergent markets the use of builders is usually limited to citric acid and its salts or a combination of citrate and fatty acid soap, while in other markets liquid detergent compositions incorporate an intermediate level of soap, about 15%, or tripolyphosphate, about 20%, to assist overall cleaning efficacy.

Other common additives to detergent and cleaning agent formulations are bleaching agents, used in an amount of up to 30 wt %, corrosion inhibitors, such as silicates, used in an amount of up to 25 wt % and graying inhibitors used in an amount of up to 5%. Suitable bleaching agents are for example, perborates, percarbonates or chlorine-generating substances, such as chloroisocyanurates, suitable silicates used as corrosion inhibitors are, for example, sodium silicate, sodium disilicate and sodium metasilicate and examples of graying inhibitors are carboxymethyicellulose, methylcellulose, hydroxypropyimethylcellulose and graft copolymers of vinyl acetate and polyalkylene oxides having a molecular weight of 1000 to 15,000. Other common detergent additives optionally used are optical brighteners, enzymes and perfumes. Powdered detergent formulations can also contain up to 50 wt % of an inert diluent, such as sodium sulfate, sodium chloride, or sodium borate. The detergent formulations can be anhydrous or they can contain small amounts, for example up to 10 wt %, of water. Liquid detergents can contain up to 80 wt % water as an inert diluent.

The above-described biodegradable graft copolymers can be added to all detergent and cleaning agent formulations and are used in amounts between 0.5 and 30%, preferably between 1 and 15 wt %, based on the total weight of the formulation. In most cases, particularly when used as soil redeposition inhibitors, the amount of biodegradable copolymer actually used is preferably between 2 and 10 wt %, based on the detergent and cleaning agent mixture. Of particular importance is the use of the additives according to the invention in phosphate-free and low-phosphate detergents and cleaning agents, particularly those containing a precipitant builder such as sodium carbonate. The low-phosphate formulations contain up to a maximum of 25 wt % of sodium tripolyphosphate or pyrophosphate. In view of their biodegradability, the copolymers according to the invention are preferably used at high concentration in phosphate-free formulations and serve as builders in place of the phosphates.

If desired, the biodegradable copolymers according to the invention can be used in detergent formulations together with non-biodegradable copolymers of acrylic acid and maleic acid or with acrylic acid homopolymers. The East-mentioned non-biodegradable polymers are currently being used as soil redeposition inhibitors in detergent formulations. In addition to the afore-mentioned polymers, the copolymers of from $C_3$ to $C_6$ monocarboxylic and dicarboxylic acid or maleic anhydride and from $C_1$ to $C_4$ alkyl vinyl ethers are also suitable as soil redeposition inhibitors. The molecular weight of the homopolymers and copolymers is 1000 to 100,000. If desired, these soil redeposition inhibitors can be used in detergents, together with the biodegradable copolymers of the invention, in an amount of up to 20 wt % based on the total formulation. Although the known soil redeposition inhibitors based on the said polymers are not biodegradable, in water treatment plants they can be removed from waste water together with the activated sludge on which they are adsorbed. The biodegradable copolymers can be added to detergent formulations in the free acid form or in completely or partly neutralized form.

Other applications for the graft copolymers of this invention include water treatment. Water treatment applications for these copolymers include dispersing applications, such as in aqueous clay dispersions for paper making, and anti-nucleating agents where minor amounts of the copolymers can serve as threshold inhibitors for crystal formation or scaling in cooling towers or boilers. When used to inhibit crystal formation or scaling, the water-soluble copolymers are often combined with corrosion inhibitors such as inorganic or organic phosphates or phosphonates or metallic salts such as zinc compounds and the like. The copolymers of the present invention can be added directly to the aqueous system or they can be added as a concentrated aqueous composition wherein the copolymer is present in the composition at a level of from 20% to 60% by weight.

The following specific examples are intended to illustrate specific embodiments of the invention which should not be interpreted as narrowing the broader aspects thereof which should be manifest from the specification. Unless otherwise indicated, all percentages are weight percentages.

Graft Copolymer Synthesis

EXAMPLE 1

To a two liter, 4 neck flask equipped with a mechanical stirrer, reflux condenser, and inlets for the gradual addition of monomers, caustic solution and initiator solution were added 250 grams of deionized water, 16 grams of a 0.15% copper (II) sulfate pentahydrate aqueous solution and 100 grams of polyethylene glycol (Mw=3400). This solution was heated to reflux and then 250 grams of glacial acrylic acid, an initiator solution of 83.3 grams of 30% hydrogen peroxide and a base neutralizer solution of 208 grams of a 50% solution of sodium hydroxide (75 eq. % neutralized) were added linearly and separately over two hours. Once the additions were complete, the system was kept at reflux for an additional twenty minutes. The system was then cooled to 60° C., and 49.3 grams of a 50% sodium hydroxide solution was added as a post neutralization.

The resultant polymer solution had a pH of 7.2 and a solids content of 48.2%. Based on gel permeation chromatography (GPC), the weight average molecular weight (Mw) was 4850 and the number average molecular weight (Mn) was 2060. The residual acrylic acid content was 0.01%.

EXAMPLE 2

The procedure of Example 1 was repeated except 100 grams of polyethylene glycol (Mw=1000) was initially added to the reactor, and 46.1 grams of a 50% sodium hydroxide solution was added for the post reaction neutralization.

The resultant polymer solution had a pH of 7.0 and a solids content of 46.9%. Based on GPC, Mw was 5000 and Mn was 3440. The residual acrylic acid content was 0.3%.

EXAMPLE 3

The procedure of Example 1 was repeated except 100 grams of polyethylene glycol (Mw=8000) was initially added to the reactor and 52.9 grams of a 50% sodium hydroxide solution was added for the post reaction neutralization.

The resultant polymer had a pH of 7.3 and a solids content of 45.2%. Based on GPC, Mw was 5690 and Mn was 3650. The residual acrylic acid content was 0.38%.

EXAMPLE 4

The procedure of Example 1 was repeated except 100 grams of polyethylene glycol (Mw=400) was initially added to the reactor, and 49.3 grams of a 50% sodium hydroxide solution was added for the post reaction neutralization.

The resultant polymer solution had a pH of 7.2 and a solids content of 44.3%. Based on GPC, Mw was 3430 and Mn was 2720. The residual acrylic acid content was <0.01%

EXAMPLE 5

The procedure of Example 1 was repeated except 100 grams of polyethylene glycol (Mw=3400) was initially added to the reactor, the initiator cofeed was 166.6 grams of a 30% hydrogen peroxide solution and 37.9 grams of a 50% sodium hydroxide solution was added for the post reaction neutralization.

The resultant polymer had a pH of 7.2 and a solids content of 42.6%. Based on GPC, Mw was 940 and Mn was 537 The residual acrylic acid content was <0.01%.

EXAMPLE 6

The procedure of Example 1 was repeated except 100 grams of polyethylene glycol (Mw=3400) and 32 grams of 0.15% copper sulfate pentahydrate solution was added to the reactor and 45.9 grams of a 50% sodium hydroxide solution was added for the post reaction neutralization.

The resultant polymer had a pH of 7.7 and a solids content of 47.7%. Based on GPC, Mw was 4750 and Mn was 3100. The residual acrylic acid content was 0.01%.

EXAMPLE 7

The procedure of Example 1 was repeated except 100 grams of polyethylene glycol (Mw=1000) and 32 grams of 0.15% copper sulfate pentahydrate solution was added to the reactor, and 45.9 grams of a 50% sodium hydroxide solution was added for the post reaction neutralization.

The resultant polymer had a pH of 7.7 and a solids content of 45.6%. Based on GPC, Mw was 4250 and Mn was 3000. The residual acrylic acid content was <0.01%.

EXAMPLE 8

The procedure of Example 1 was repeated except 200 grams of polyethylene glycol (Mw=1000) and 400 grams of deionized water was added to the reactor and 45.9 grams of a 50% sodium hydroxide solution was added for the post reaction neutralization.

The resultant polymer had a pH of 5.7 and a solids content of 45.7%. Based on GPC, Mw was 4950 and Mn was 3480. The residual acrylic acid content was <0.01%.

EXAMPLE 9

The procedure of Example 1 was repeated except 200 grams of polyethylene glycol (Mw=3400), 400 grams of deionized water and 32 grams of a 0.15% copper pentahydrate solution was added to the reactor and 45.0 grams of a 50% sodium hydroxide solution was added for the post reaction neutralization.

The resultant polymer had a pH of 7.4 and a solids content of 45.1%. Based on GPC, Mw was 3760 and Mn was 2420. The residual acrylic acid content was <0.01%.

EXAMPLE 10

To a three liter, 4 neck flask equipped with a mechanical stirrer, reflux condenser, and inlets for the gradual addition of monomers, caustic solution and initiator solution were added 403 grams of deionized water, 26.9 grams of a 0.15% copper (II) sulfate pentahydrate aqueous solution and 168 grams of polyethylene glycol (Mw=3400). This solution was heated to reflux and then 420 grams of glacial acrylic acid, an initiator solution of 140 grams of 30% hydrogen peroxide and a base neutralizer solution of 349 grams of a 50% solution of sodium hydroxide (75 eq.% neutralized) were added linearly and separately over two hours. Once the additions were complete, the system was kept at reflux for an additional 30 minutes. The system was then cooled to 60° C., and 71.2 grams of a 50% sodium hydroxide solution was added as a post neutralization.

The resultant polymer solution had a pH of 7.3 and a solids content of 45.4%. Based on GPC, Mw was 5720 and Mn was 3510. The residual acrylic acid content was less than 0.01%.

EXAMPLE 11

To a two liter, 4 neck flask equipped with a mechanical stirrer, thermometer, condenser and inlets for the gradual addition of monomers, substrate, initiator and neutralizer solutions was added 50 grams of deionized water and 16 grams of a 0.15% copper (II) sulfate pentahydrate solution. A monomer cofeed of 250 grams of glacial acrylic acid, an initiator cofeed solution of 83.3 grams of 30% hydrogen peroxide, a cofeed solution of polyethylene glycol (Mw=3400) in 200 grams deionized water and a neutralizer solution of 208 grams (75 equivalent % neutralized) of a 50% solution of sodium hydroxide were prepared. Initially, 10% of each of the cofeed solutions were added to the flask and then the contents of the flask was heated to reflux. The remaining amounts of cofeed solution were then added linearly and separately over two hours. At the competition of the feeds, the reaction was held for 30 minutes at reflux. The reaction was then cooled to 60° C. and 49.3 grams of 50% sodium hydroxide solution was added as a post reaction neutralization.

The resultant polymer had a pH of 6.6 and a solids content of 42.4%. Based on GPC, Mw was 8110 and Mn was 2460. The residual acrylic acid content was <0.01%.

EXAMPLE 12

The procedure of Example 11 was repeated except 66 grams of deionized water was used in the initial charge. The polyethylene glycol cofeed solution was prepared using 16 grams of a 0.15% copper (II) sulfate pentahydrate solution, 184 grams of deionized water and 100 grams of polyethylene glycol (Mw=8000).

The resultant polymer had a pH of 7.6 and a solids content of 45.0%. Based on GPC, Mw was 7860 and Mn was 3560. The residual acrylic acid content was <0.01%.

EXAMPLE 13

The procedure of Example 1 was repeated except 3.9 grams of a 1% aqueous solution of ethylenediaminetetraacetic acid iron (III) monosodium salt was added to the flask in place of the copper (II) sulfate pentahydrate solution.

The resultant polymer solution had a pH of 6.5 and a solids content of 48.5%. Based on GPC, Mw was 8400 and Mn was 2880. The residual acrylic acid content was 0.62%.

EXAMPLE 14

The procedure of Example 1 was repeated except 3.9 grams of a 1% aqueous solution of ethylenediaminetetraacetic acid copper (II) disodium salt was added to the flask in place of the copper (II) sulfate pentahydrate solution.

The resultant polymer solution had a pH of 6.8 and a solids content of 46.4%. Based on GPC, Mw was 6840 and Mn was 1820. The residual acrylic acid content was <0.01%.

EXAMPLE 15

The procedure of Example 1 was repeated except 100 grams of Neodol® C12-C15 polyethylene oxide was added to the flask instead of the polyethylene glycol.

The resultant polymer solution had a pH of 8.7 and a solids content of 47.5%. Based on GPC, Mw was 6190 and Mn was 4230. The residual acrylic acid content was <0.01%.

EXAMPLE 16

The procedure of Example 1 was repeated except 50 grams of polyethylene glycol (Mw 3400) was added to the flask.

The resultant polymer had a pH of 7.3 and a solids content of 42.1%. Based on GPC, Mw was 5080 and Mn was 3470. The residual acrylic acid content was 0.05%.

EXAMPLE 17

The procedure of Example 1 was repeated except 16 grams of a 0.15% iron (III) sulfate heptahydrate solution was added to the flask in place of the copper (II) sulfate pentahydrate solution.

The resultant polymer had a pH of 6.7 and a solids content of 45.9%. Based on GPC, Mw was 126(:)0 and Mn was 2300. The residual acrylic acid content was 0.22%.

EXAMPLE 18

The procedure of Example 1 was repeated except 450 grams of deionized water and 500 grams of polyethylene glycol (Mw 3400) was added to the flask.

The resultant polymer had a pH of 7.1 and a solids content of 51.9%. Based on GPC, Mw was 3720 and Mn was 1380. The residual acrylic acid content was 0.06%.

EXAMPLE 19

The procedure of Example 1 was repeated except 250 grams of polyethylene glycol (Mw=3400) was added to the flask.

The resultant polymer had a pH of 6.7 and a solids content of 53.1%. Based on GPC, Mw was 4480 and Mn was 2110. The residual acrylic acid content was <0.01%.

EXAMPLE 20

The procedure of Example 1 was repeated except the monomer cofeed consisted of 200 grams of glacial acrylic acid and 42.4 grams of maleic anhydride. The base neutralizer solution was 218 grams of a 50% NaOH solution and the post reaction neutralization solution was 39 grams of a 50% NaOH solution.

The resultant polymer had a pH of 7.9 and a solids content of 46.5%. Based on GPC, Mw was 4880 and Mn was 1830. The residual acrylic acid content was 0.06% and the residual maleic acid content was 0.33%.

EXAMPLE 21

To a two liter, 4 neck flask equipped with a mechanical stirrer, a reflux condenser, and inlets for the gradual additions of monomer, neutralizer and initiator solutions were added 100 grams of deionized water, 16 grams of a 0.15% copper (II) sulfate pentahydrate aqueous solution and 100 grams of polyethylene glycol (Mw 1000). The solution was heated to reflux and then a monomer solution of 200 grams of glacial acrylic acid, 50 grams of itaconic acid and 200 grams of deionized water; a neutralizer solution of 228.3 grams of a 50% solution of sodium hydroxide in deionized water; and an initiator solution of 83.3 grams of a 30% hydrogen peroxide solution was added linearly and separately over two hours. When the feeds were complete, reflux continued for twenty minutes and then the reaction was cooled to room temperature.

The resultant polymer had a pH of 6.1 and a solids content of 45.6%. Based on GPC, Mw was 2850 and Mn was 2110. The residual acrylic acid content was 0.03% and residual itaconic acid content was 0.27%.

EXAMPLE 22

The procedure of Example 1 was repeated except 100 grams of Emuiphor ® EL-620 ethoxylated castor oil was added to the flask instead of the polyethylene glycol. The post reaction neutralizer was 48.1 grams of a 50% solution of sodium hydroxide.

The resultant polymer had a pH of 7.0 and a solids content of 46.5%. Based on GPC, Mw was 4950 and Mn was 2940. The residual acrylic acid content was <0.01%.

EXAMPLE 23

The procedure of Example 1 was repeated except the monomer cofeed solution contained 125 grams of glacial acrylic acid and 125 grams of glacial methacrylic acid. The base neutralizer cofeed contained 191 grams of a 50% solution of sodium hydroxide. The post reaction neutralization solution was 38.8 grams of 50% solution of NaOH.

The resultant polymer had a pH of 7.2 and a solids content of 46.7%. Based on GPC, Mw was 6200 and Mn was 2030. The residual acrylic acid content was 0.56% and residual methacrylic acid content was 0.16%.

Biodegradation Testing

The biodegradabilities of some of the above-described graft copolymers are listed in the tables below. Polymer biodegradabilities were measured on a scale of 0 to 100% based on BOD (biological oxygen demand) testing, the $CO_2$ produced and the dissolved organic content (SCAS). The results are in Tables II and III. The BOD procedure is the method in *Standard Methods for Examination of Water & Wastewater*, page 525, 16th edition (1985) and the SCAS and $CO_2$ tests were done according to the procedures in, *OECD Guidelines for Testing of Chemicals*, (modified Strum method, $CO_2$ test No. 301B, SCAS test No. 302A).

The BOD test used was a closed bottle test whereby a solution of the candidate polymers and mineral salts is inoculated with municipal sewage bacteria. Biodegradation was indicated by oxygen uptake, which was determined by measuring the dissolved oxygen content of the solution.

BOD test results provided are for 5 mg/300 ml concentrations and are for the durations listed. The $CO_2$ test results are for 10 mg/300 ml and the SCAS test results are for 20 mg/300 ml.

Powdered Detergent Formulation and Performance Evaluation

A 4"×4" white cotton swatch was soiled with approximately 1 gram of a 50% slurry (in water) of Skippack clay. The soil, covering a 2" diameter circle centered on the swatch, is allowed to air dry overnight. Clean fabric (for redeposition test) was a 4"×4" white cotton swatch which was unsoiled.

The detergent compositions were tested in a Terg-o-Tometer at the following conditions; 40° C., 100 rpm, 100 ppm hardness (50% city tap water/50% de-ionized water), 12 minute wash with one 3 minute rinse, 1300 ppm detergent and 5 cloths per pot (3 of them soiled). The wash water was pre-heated, the fabric swatches were added and then dissolved detergent (2.6 grams of a 50% slurry in 100 mls water) was added. Following the wash period the swatches were wrung, and following the rinse cycle the swatches were wrung again and then air dried. Swatches washed in a detergent containing polyacrylic acid homopolymer were always run as a control.

Reflectance was measured using a Pacific Scientific Colorimeter (Colorgard System 1000) and the data recorded using the L,a,b color scale. Detergency values (E) and whiteness index (W.I.) are calculated as:

$$E = \sqrt{(Ls-L)^2 + (as-a)^2 + (bs-b)^2}$$

$$W.I. = L/100(L-(5.715 \times b))$$

where Ls, as, and bs are the reflectivity reading for the soiled swatches and L,a,b are the reflectivity readings for the washed swatches.

Each polymer was evaluated in three separate washing experiments. The detergent composition shown in Table I was used for the above described performance evaluation and the results of the detergent performance evaluation are listed in Tables II and III along with the BOD biodegradation data. Additional possible powdered detergent formulations containing the polymers of this invention are presented, but not limited to, the formulations as shown in Table IV.

TABLE I

| Powdered Detergent Composition Used to Evaluate the Polymers of this Invention | |
|---|---|
| Detergent Component | Amount, % |
| sodium carbonate | 22.0 |
| zeolite A | 16.0 |
| sodium silicate | 2.7 |
| LAS | 8.3 |
| lauryl sulfate | 8.3 |
| sodium sulfate | 34.0 |
| polymer | 1.7 |
| water | 7.0 |

TABLE II

Biodegradation, Clay Soil Removal and Redeposition Test Data

| EX-AMPLE | BIODEGRADATION BOD, % | Days, No. | DETERGENCY, E | REDEPOSITION, W.I. |
|---|---|---|---|---|
| 1 | 37.4 | 37 | 39.9 | 78.3 |
| 2 | 70.6 | 47 | 40.3 | 69.8 |
| 3 | 73.0 | 47 | 40.2 | 70.0 |
| 4 | 13.7 | 14 | 40.2 | 69.6 |
| 5 | 29.5 | 47 | 40.0 | 71.1 |
| 6 | 49.1 | 52 | 39.5 | 70.8 |
| 8 | 63.5 | 52 | 37.3 | 68.2 |
| 9 | 100.4 | 52 | 40.0 | 70.7 |
| 11 | 52.0 | 54 | 40.5 | 71.0 |
| 12 | 44.5 | 54 | 40.0 | 70.7 |

TABLE III

| | Biodegradation, % | |
|---|---|---|
| Example | $CO_2$ | SCAS |
| 1 | 19.4 | 44.6 |
| 6 | 41.0 | 31.2 |

TABLE IV

POWDER COMPOSITIONS

| | TPP[1] | PYRO[2] | Phosphate | NON-Phosphate |
|---|---|---|---|---|
| Anionic | | | | |
| LAS[3] | 5 | 5 | 6 | 7.5 |
| Lauryl Sulfate | 8 | 13 | — | — |
| Alcohol Ether Sulfate | 3 | — | — | — |
| PEO[4] Alcohol | 1.5 | 2 | — | — |
| TPP | 38 | — | 30 | — |
| Pyro | — | 30 | — | — |
| Sodium Carbonate | 10 | 13 | 7 | 7.5 |
| Sodium Sulfate | 15 | 24 | 15 | 20 |
| Sodium Silicate | 6 | 5 | 5 | 1.5 |
| Zeolite A | — | — | — | 25 |
| Opt. Brightener | 0.2 | 0.2 | 0.2 | 0.2 |
| Enzyme | 0.5 | 0.5 | 0.3 | 0.3 |
| NaPAA[5] | — | 0.7 | — | — |
| Soap | — | — | 1 | — |
| Nonionic (EO/PO[6]) | — | — | 5 | 5 |
| Perborate | — | — | 20 | 22.5 |
| TAED[7] | — | — | 4 | — |
| Anti-Redep. Agents | — | — | 0.2 | 0.2 |
| Sulfate | — | — | 0.5 | 0.3 |
| Water | | | | |

[1]Sodium Tripolyphosphate
[2]Sodium Pyrophosphate
[3]Linear Alkyl Sulfonates
[4]Polyethoxylate
[5]Sodium salt of polyacrylic acid
[6]Ethylene Oxide/Propylene Oxide
[7]Tetraacetyl Ethylene Diamine

Liquid Detergent Formulation and Performance Evaluation

The efficacy of the polymers of this invention in a liquid detergent formulation was evaluated by washing cotton, polyester/cotton blend (65/35) and polyester soiled fabrics in a commercially available, heavy duty liquid composition utilizing Sears Kenmore ® Ultra Fabric Care brand washing machines (model Heavy Duty 80 Series) set to typical U.S. laundering parameters. Washing conditions, soil/fabric combinations and polymer concentration are detailed in Tables V and VI, and the liquid detergent formulation base used for evaluating the copolymers of the invention is for example that shown in European Patent Application EP-0-348183 and depicted in Table VII. Table VIII shows other suitable formulations for liquid detergents which are possible but not limiting for use with the copolymers of the invention.

Soiled cloths were prepared (except where noted) by Scientific Services (Oakland, N.J.) and cut to a specified size (3½×4½"). Reflectance was measured using a Pacific Scientific Colorimeter (Colorgard System 1000) and the data recorded using the L,a,b color scale. The reflectance (L) of the soiled cloths was measured before laundering so that only cloths of the same reflectance were used in a test. Reflectance was then measured after laundering to evaluate the efficacy of the detergent and are reported as the average value. In an effort to create realistic soil/fabric combinations encountered in a consumer's wash load, soils were selected from four classes;

Particulates (clays)
Oily/Particulates (collar soils)
Oxidizables (stains)
Enzyme Sensitive (proteinaceous).

Unsoiled cotton swatches and unsoiled polyester swatches were included in the tests to assess the antiredeposition characteristics of the individual polymers. Each soil/fabric combination was evaluated with four replicates. The data were derived by averaging the reflectance values from all of the swatches stained with a given soil and appear in Table IX.

TABLE V

WASH CONDITIONS:

APPARATUS - SEARS KENMORE BRAND WASHING MACHINE
TEMPERATURE - WARM (95° F.)
HARDNESS - CONVENTIONAL (120 PPM)
AGITATION - HIGH
WASH CYCLE - MEDIUM (10 MIN.), 16.7 GALLONS/LOAD
DETERGENT DOSAGE - RECOMMENDED LEVEL - ½ CUP (130 GRAMS)
POLYMER CONCENTRATION - 5% SOLIDS (NEUTRALIZED, pH 7)

TABLE VI

| SOIL CLASS | SOIL IDENTITY (SWATCH FABRIC) |
|---|---|
| PARTICULATES | *BIG OAK CLAY (COTTON) |
| | *SKIPPACK CLAY (COTTON) |
| | SCIENTIFIC SERVICES CLAY (COTTON) |
| OILY/PART. | COSMETIC MAKEUP (COTTON) |
| | DUST/SEBUM (COTTON, PE/COTTON, PE) |
| OXIDIZABLE | GRAPE JUICE (PE/COTTON) |
| | BREWED TEA (PE/COTTON) |
| | GRASS (COTTON) |
| ENZYME | CHOC. FUDGE PUDDING (PE/COTTON) |
| REDEPOSITION | COTTON |
| | POLYESTER |

*Prepared by applying 0.7–0.8 grams of a 25% clay slurry (in water) of Skippack or Big Oak Clay to a 3½" × 4½" white cotton swatch (Cotton #405 - Test Fabrics) using a China bristle brush (#10). The soil was "painted" onto the cloth inside a 2" diameter circle and allowed to air dry overnight prior to laundering.

TABLE VII

BASE LIQUID DETERGENT FORMULATION

| Component | % by weight |
|---|---|
| Surfactants | |
| Linear Dodecylbenzene Sulfonate | 17.00 |
| Alcohol Ethoxylate (Nonionic) | 7.00 |
| Builder | 10.00 |
| Sodium Citrate | |
| Hydrotrope/Solubilizing Agent | 2.00 |
| Monoethanolamine | |

TABLE VII-continued

| BASE LIQUID DETERGENT FORMULATION | |
|---|---|
| Component | % by weight |
| Misc.* and Water | up to 100% |

*Misc. includes perfume, colorants, fatty acids, whiteners and opacifiers.

TABLE IX

| | Reflectance (L) Values with 5% Polymer | | | | | |
|---|---|---|---|---|---|---|
| | STAIN | | | | REDEPOSITION | |
| Polymer | A | B | C | D | E | F |
| None | 80.7 | 81.9 | 79.4 | 90.0 | 99.2 | 74.4 |
| Example 1 | 80.9 | 82.3 | 78.4 | 90.2 | 92.2 | n/a |
| Example 4 | 81.9 | 83.0 | 80.0 | 90.7 | 93.0 | 74.1 |
| Example 9 | 81.4 | 82.7 | 79.2 | 90.0 | 96.4 | 73.8 |
| Example 11 | 81.2 | 82.9 | 78.6 | 90.3 | 97.9 | 73.4 |

A) Oily Particulate Stain
B) Oxidizable Stain
C) Particulate Soil
D) Enzymes
E) Redeposition on Cotton (Whiteness Index)
F) Redeposition on Polyester (Whiteness Index)

Scale Inhibition

The efficacy of the polymers of the invention as a calcium carbonate ($CaCO_3$) anti-precipitant was evaluated as follows:

1. To a four ounce jar was added
   a) 50 ml of a solution of
   600 mg/l $Na_2CO_3$ as $CaCO_3$
   600 mg/l $NaHCO_3$ as $CaCO_3$
   b) 0.7 ml of 0.1% by weight polymer solids (at pH 8.0)
   c) 50 ml of a solution of
   1200 mg/l $CaCl_2$ as $CaCO_3$
   600 mg/l $MgSO_4$ as $CaCO_3$
2. The jar was capped and placed in a 54° C. water bath for twenty hours.
3. The hot samples were filtered through a 0.45 micron filter.
4. The filtrate was titrated with ethylenediaminetetraacetic acid (EDTA).

$$\% \ CaCO_3 \ \text{INHIBITION} = \frac{A - C}{B - C} \times 100$$

where A is the level in mg/l of $Ca^{2+}$ in the filtrate after precipitation, B is the level in mg/l of $Ca^{2+}$ in the sample before precipitation, and C is the level in mg/l of $Ca^{2+}$ in the sample with no polymer after precipitation. The data appear in Table X.

The efficacy of the polymers of this invention as a phosphate anti-precipitant was evaluated as follows:
1. To a four ounce jar was added
   a) 40 ml of a solution of 500 mg/l $NaHCO_3$ as $CaCO_3$
   b) 20 ml of a solution of 25 mg/l $Na_2H\ PO_4$ as $PO_4^{3-}$
   c) 1.0 or 1.5 ml of 0.1% by weight polymer solids (at pH 8.0)
   d) 40 ml of a solution of
   1000 mg/l $CaCl_2$ as $CaCO_3$
   500 mg/l $MgCl_2$ as $CaCO_3$
   e) 0.2 ml of a solution of 250 mg/l $FeCl_3$ as $Fe^{3+}$
2. The pH was adjusted to 8.5 with dilute NaOH.
3. The jar was capped and placed in a 49° C. water bath for twenty hours.
4. Hot samples were filtered through a 0.45 micron filter.
5. The filtrate was analyzed for phosphate using the ascorbic acid method (APHA standard 13th edition p. 532, 1971).

$$\% \ PO_4^{3-} \ \text{INHIBITION} = \frac{A - C}{B - C} \times 100$$

where A is the level in mg/l of $PO_4^{3-}$ in the filtrate after precipitation, B is the level in mg/l of $PO_4^{3-}$ in the sample before precipitation, and C is the level in mg/l of $PO_4^{3-}$ in the sample with no polymer after precipitation. The data appear in Table X.

The efficacy of the polymers of the invention as a dispersant was evaluated as follows:
1. To a Cowles mixing cup were added:
   320 ml of 200 mg/l of 200 mg/l $CaCl_2$ as $CaCO_3$
   0.32 g of Hydrite UF Kaolin Clay (1000 mg/l Kaolin)
2. The mixture was stirred at high speed for ten minutes.
3. The pH was adjusted to 7.5 with dilute NaOH.
4. 100 ml aliquots were placed in four ounce jars
5. 1 ml of a 0.1% polymer solution (adjusted to pH 8) was added to each aliquot.
6. The jars were capped and placed on a shaker at low speed for 10 minutes.
7. The samples were transferred to graduated cylinders and stood undisturbed for three hours.
8. The top 25 ml of each sample were transferred to a one ounce vial.
9. The turbidity of each sample was measured in Nephelometric Turbidity Units (NTU's)

$$\% \ \text{KOALIN DISPERSANCY} = \frac{A - C}{B - C} \times 100$$

where A is the turbidity in NTU's of the sample after three hours, B is the turbidity in NTU's of the sample immediately after agitation, and C is the turbidity in NTU's of a control sample containing no polymer after three hours. The data appear in Table X.

TABLE X

| Polymer Dosage | % $CaCO_3$ Inhibition | | % $PO_4^{3-}$ Inhibition | % Kaolin Dispersancy | |
|---|---|---|---|---|---|
| | 5 mg/l | 10 mg/l | 10 mg/l | 15 mg/l | 10 mg/l |
| none | 0 | 0 | 0 | 0 | 0 |
| Example 1 | 39 | 34 | 0 | 3 | 30 |
| Example 9 | 34 | 37 | 8 | 73 | 75 |
| Example 4 | 36 | 40 | 38 | 40 | 59 |

Hard Surface Cleaner: Formulation and Performance Evaluation

Dishwashing tests were performed using a modified version of A.S.T.M. method D 3556-85, *Standard Test Method for Deposition on Glassware During Mechanical Dishwashing*. This test method covers a procedure for measuring performance of household automatic dishwashing detergents in terms of the build-up of spots and film on glassware. Glass tumblers were given multiple cycles in a dishwasher, in the presence of food soils, and the levels of spotting and filming allowed by the detergents under test were compared visually.

A Kenmore ® brand dishwashing machine was used to perform the washing tests. The bottom rack of the dishwasher was randomly loaded with 10-12 dinner plates and the top rack was randomly loaded with several beakers and cups. Four new 10 ounce tumblers were placed randomly on the top racks as the test glasses. Soil used in the test was a mixture of 80% margarine and 20% non-fat dry milk. The amount of soil used for each test was 40 grams for the first wash of each complete cycle.

When a test was ready to be started, the soil was smeared across the four plates on the bottom rack, the detergent for the first cycle was placed in the detergent dispenser cup, and the machine was started. The dishwashing machines had a short and a long cycle. The experiments were conducted using three consecutive long cycles, i.e. normal washes, each of which consisted of a wash, a rinse, a second wash, two more rinses, and then a drying cycle. During the normal wash, at the start of the second wash (about twelve minutes into a normal cycle), the machine was opened and a second detergent aliquot added. Additional soil was not added at the time when a second detergent dose was added. The machine was then allowed to run the full cycle including the drying time.

When the drying cycle was completed, the door was opened and the four glasses were removed and evaluated for filming and spotting. The test glasses were evaluated by placing them in light box equipped with a fluorescence light. The glasses were ranked according to the following scale:

| Filming | Spotting |
|---|---|
| 0 No film | 0 No spots |
| 1 Barley perceptible | 1 Random |
| 2 Slight | 2¼ of glass |
| 3 Moderate | 3½ of glass |
| 4 Heavy | 4 Complete spotting |

An average filming and spotting rating was derived from the individual ratings by adding all the ratings for each glass per cycle, dividing by the number of glasses, then multiplying times the number of cycles. This numerical rating gave a good indication of the overall performance for each detergent tested. It was also noted if streaking existed or calcium deposits were present.

The water hardness conditions for the supply water to the dishwasher was 200 ppm. The temperature of the supply water was maintained at 120° F.

The detergents tested were based on Vert (Consumer product from Canada-Loblaws) which is a phosphate-free, chlorine-free formulation comprising about 12% $Na_2SO_4$, 16% $H_2O$, less than about 40% $Na_2CO_3$, silicate, citrate. When evaluations with chlorine were done, 1% by weight of the formulation of NaOCl was added. The results appear in Table XI.

TABLE XI

| % Chlorine Available | % Polymer | Third Cycle Average | | | |
|---|---|---|---|---|---|
| | | Film | Spot | Film | Spot |
| 0 | 0 | 4.0 | 4.0 | 2.2 | 3.2 |
| 1 | 0 | 2.5 | 0.5 | 1.6 | 0.5 |
| 1 | 2% polyacrylic acid* | 0.2 | 0.0 | 0.2 | 0.4 |
| 1 | 2% Example 10 | 0.5 | 0.7 | 0.3 | 0.4 |

*Neutralized, spray-dried homopolymer of acrylic acid with weight average molecular weight of 4,500.

We claim:

1. A method of dispersion comprising adding to an aqueous system a water treatment composition comprising a mixture of one or more water-soluble metal salts and water-soluble graft copolymer wherein the water-soluble graft copolymer is prepared by grafting to a biodegradable substrate, in the presence of from about 1 to 200 ppm of water-soluble metal salts,
   (a) a carboxylic acid functional unsaturated monomer and optionally
   (b) one or more other water-soluble, monoethylenically unsaturated monomers copolymerizable with (a),
   wherein said substrate is selected from the group consisting of polymers and copolymers of alkylene oxides,
   wherein the weight ratio of said substrate to said carboxylic acid functional monomer (a) is from 1:20 to 4:1 and the weight of monomer (b) being from 0 to 35% based on the total weight of said substrate,
   wherein monomers (a) and (b) form a side chain on said substrate,
   wherein said copolymers are at least 25% biodegradable and
   wherein the polymer mixture is contained in the water treatment composition at a concentration of from about 20 to 60 percent by weight.

2. A method of inhibiting incrustation comprising adding to an aqueous system a water treatment composition comprising a mixture of one or more water-soluble metal salts and water-soluble graft copolymer wherein the water-soluble graft copolymer is prepared by grafting to a biodegradable substrate, in the presence of from about 1 to 200 ppm of water-soluble metal salts,
   (a) a carboxylic acid functional unsaturated monomer and optionally
   (b) one or more other water-soluble, monoethylenically unsaturated monomers copolymerizable with (a),
   wherein said substrate is selected from the group consisting of polymers and copolymers of alkylene oxides,
   wherein the weight ratio of said substrate to said carboxylic acid functional monomer (a) is from 1:20 to 4:1 and the weight of monomer (b) being from 0 to 35% based on the total weight of said substrate,
   wherein monomers (a) and (b) form a side chain on said substrate,
   wherein said copolymers are at least 25% biodegradable and
   wherein the polymer mixture is contained in the water treatment composition at a concentration of from about 70 to 60 percent by weight.

3. A method of dispersion comprising adding to an aqueous system a polymer mixture comprising one or more water-soluble metal salts and water-soluble graft copolymer wherein the water-soluble graft copolymer is prepared by grafting to a biodegradable substrate, in the presence of from about 1 to 200 ppm of water-soluble metal salts,
   (a) a carboxylic acid functional unsaturated monomer and optionally
   (b) one or more other water-soluble, monoethylenically unsaturated monomers copolymerizable with (a),
   wherein said substrate is selected from the group consisting of polymers and copolymers of alkylene oxides,
   wherein the weight ratio of said substrate to said carboxylic acid functional monomer (a) is from 1:20 to 4:1 and the weight of monomer (b) being from 0 to 35% based on the total weight of said substrate, wherein monomers (a) and (b) form a side chain on said substrate, and wherein said copolymers are at least 25% biodegradable.

4. A method of inhibiting incrustation comprising adding to an aqueous system a polymer mixture comprising one or more water-soluble metal salts and water-soluble graft copolymer wherein the water-soluble graft copolymer is prepared by grafting to a biodegradable substrate, in the presence of from about 1 to 200 ppm of water-soluble metal salts, (a) a carboxylic acid functional unsaturated monomer and optionally (b) one or more other water-soluble, monoethylenically unsaturated monomers copolymerizable with (a), wherein said substrate is selected from the group consisting of polymers and copolymers of alkylene oxides, wherein the weight ratio of said substrate to said carboxylic acid functional monomer (a) is from 1:20 to 4:1 and the weight of monomer (b) being from 0 to 35% based on the total weight of said substrate, wherein monomers (a) and (b) form a side chain on said substrate, and wherein said copolymers are at least 25%, biodegradable.

* * * * *